United States Patent Office 3,347,942
Patented Oct. 17, 1967

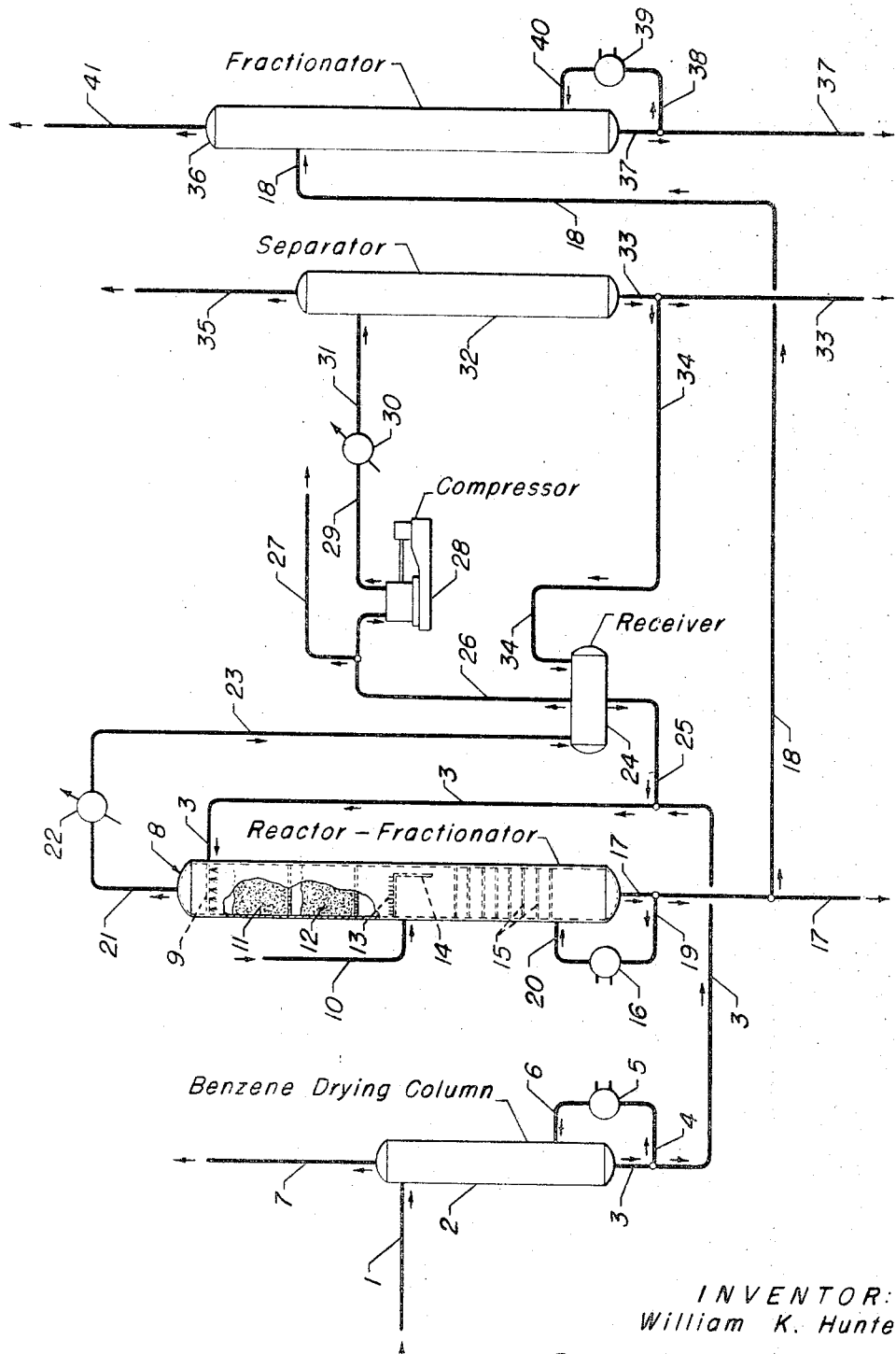

3,347,942
HALOGENATION OF AROMATIC
HYDROCARBONS
William K. Hunter, Mount Prospect, Ill., assignor to Universal Oil Products Company, Des Plaines, Ill., a corporation of Delaware
Filed July 6, 1964, Ser. No. 380,258
3 Claims. (Cl. 260—650)

This invention relates to the halogenation of aromatic hydrocarbons and more particularly to an improved process for the chlorination of benzene to prepare monochlorobenzene.

Monochlorobenzene is a valuable base compound for the manufacture of diversified chemicals. For example, monochlorobenzene is converted to p-nitrochlorobenzene which, in turn, is used for the manufacture of phenylenediamines and derivatives thereof. Monochlorobenzene also is used in the manufacture of phenol.

A major difficulty hereinbefore encountered in the manufacture of monochlorobenzene is the inherent production of polychlorobenzenes and particularly dichlorobenzenes. The inherent production of polychlorobenzenes is reduced to a minimum in the novel process of the present invention, in which process the monochlorobenzene product is removed from further contact with chlorine to thereby avoid further chlorination. This is accomplished in a novel combination reactor-fractionator system in which the reaction occurs in the upper portion of the reactor-fractionator zone and the descending monochlorobenzene product is passed into the lower portion of the combination reactor-fractionator zone without further contacting the ascending stream of chlorine. Fractionation of the reaction mixture occurs in the lower portion of the combination zone to separate monochlorobenzene from unreacted benzene, the latter being vaporized and the vapors ascend into the upper portion of the zone for reaction therein.

In order to minimize the formation of polychlorobenzenes, it is important that the mole ratio of benzene to chlorine be high in the reaction section of the combination zone. This is accomplished in a unique manner in accordance with the present invention by utilizing a high benzene recycle rate and by passing the excess and unreacted benzene and the monochlorobenzene product into the lower portion of the combination zone out of contact with the gaseous chlorine introduced into a mid-portion of the combination zone. The excess and unreacted benzene is vaporized in the lower portion of the combination zone, and the benzene vapors ascend into the mid-portion of the zone wherein the benzene vapors contact and dilute the gaseous chlorine introduced into the mid-portion of the zone. This vapor phase dilution of the chlorine gas by benzene vapors prior to contact of the chlorine with the liquid benzene charged to the process minimizes the formation of polychlorobenzenes and increases the production of monochlorobenzene.

In one embodiment the present invention relates to a process for the continuous chlorination of benzene which comprises continuously introducing liquid benzene into the upper portion of a combination reactor-fractionator zone, passing the benzene downwardly through a bed of a nuclear chlorinating catalyst disposed in the upper portion of said zone, continuously introducing gaseous chlorine beneath collecting-distributing means disposed in the mid-portion of said zone, reacting benzene and chlorine in contact with said catalyst in the upper portion of said zone to form chlorobenzene, passing chlorobenzene and unreacted benzene downwardly from said catalyst bed into the lower portion of said combination zone through downspout means positioned in the mid-portion of said zone, whereby said descending chlorobenzene and unreacted benzene do not contact the chlorine introduced into the mid-portion of said zone, heating the lower portion of said zone to vaporize and separate benzene from chlorobenzene, passing the resultant benzene vapors into contact with said gaseous chlorine in the mid-portion of said zone and passing the mixture of chlorine and benzene upwardly into said catalyst bed in the upper portion of said zone, continuously withdrawing chlorobenzene from the lower portion of said combination zone, and continuously withdrawing hydrogen chloride formed in said reaction from the upper portion of said combination zone.

The invention is further described with relation to the accompanying diagrammatic flow drawing which illustrates a specific embodiment of the invention.

In general, it is preferred that the chlorination reaction be effected in a relatively dry environment. Accordingly, the benzene charged to the process preferably is dried in any suitable manner. The drawing illustrates a benzene drying column in which the benzene charge is introduced through line 1 into column 2 and therein is subjected to heating in order to vaporize and remove water and, if any, other volatile components. Column 2 preferably contains suitable packing material including Raschig rings, carbon steel Pall rings, ceramic rings, etc. and/or fractionating trays including side to side pans, bubble decks, bubble trays, etc. In the case here illustrated, heating of the lower portion of column 2 is accomplished by recirculating a portion of the benzene product, being withdrawn by way of line 3, through line 4, into and through reboiler 5 and returned by way of line 6 to column 2. Any suitable method of heating in reboiler 5 may be employed or, when desired, an externally fired heater may be utilized. The vaporized water and other volatile components, if any, are withdrawn from the upper portion of column 2 by way of line 7. When desired, the overhead vapors may be condensed and collected in the receiver and the resultant condensate may be returned to the upper portion of column 2. The overhead condenser and receiver have been omitted from the drawing in the interest of simplicity, but generally will be employed when benzene drying column 2 is utilized. This has the advantage of recovering any benzene which may have been entrained in the overhead vapors. Column 2 is operated at any suitable pressure, bottom temperature and top temperature to accomplish the desired drying. The column preferably is operated at a low pressure which may range from atmospheric to 50 pounds per square inch or more and preferably from about 5 to about 25 pounds per square inch gauge and at a bottom temperature of from about 200° to about 250° F. or more. The top temperature preferably is as low as is practical and generally will range from about 80° to about 120° F. It is understood that higher or lower temperatures and pressures may be used in this column, but as herein before set forth, they will be selected to obtain the desired drying of the benzene charge. In another embodiment, drying of the benzene may be accomplished by molecular sieves, silica gel, etc., or by means of chemical desiccants.

The benzene from column 2 is passed by way of line 3, together with recycle benzene recovered in the manner to be hereinafter described, into the upper portion of combination reactor-fractionator zone 8. The benzene preferably is introduced into zone 8 through a suitable distributing device illustrated at 9. Gaseous chlorine is introduced through line 10 into a mid-portion of zone 8. It will be noted that zone 8 contains suitable catalytic material in the upper portion thereof, two such beds being illustrated at 11 and 12. It is understood that 1 or 3 or more separate catalyst beds may be utilized in this zone. Any suitable catalyst may be employed including carbon steel Pall rings, carbon steel Rasching rings, iron turnings, etc., or these or other suitable supports impregnated with ferric chloride. In the mid-portion of zone 8 there is provided collecting-distributing means 13 having downspout 14. The lower portion of zone 8 contains suitable fractionating trays including side to side pans, bubble decks, bubble trays, etc., illustrated at 15, and/or, when desired, packing material such as ceramic rings, saddles, etc. Heat is supplied to the lower portion of zone 8 by means of reboiler 16 although, here again, an externally fired furnace or any other suitable means of providing heat may be used.

In operation, the liquid benzene introduced into the upper portion of zone 8 descends into the catalyst bed. The gaseous chlorine entering into the mid-portion of the zone passes upwardly through distributing means 13 to admix with the benzene to effect the chlorination of the benzene in contact with the catalyst. The monochlorobenzene product formed in the reaction and excess and unreacted benzene descend downwardly from the catalyst bed to be collected on distributing means 13 and overflowing through downspout 14 into the lower portion of the combination zone. It will be noted that the monochlorobenzene product does not contact the ascending chlorine and thereby avoids overchlorination of the benzene. In the lower portion of the zone, the excess and unreacted benzene is vaporized and the benzene vapors ascend and mix with the chlorine introduced through line 10, thereby maintaining a high ratio of benzene to chlorine and diluting the chlorine before it contacts the descending liquid benzene. As herein before set forth, this unique method minimizes the formation of polychlorobenzenes and results in increased production of monochlorobenzene.

The chlorobenzene product is withdrawn from the lower portion of zone 8 by way of line 17 and, while all or a portion thereof may be removed as the product of the process, preferably at least a portion thereof is passed through line 18 for further fractionation in the manner to be hereinafter described. A portion of the chlorinated product being withdrawn through line 17 is passed by way of line 19 into and through reboiler 16 and returned by way of line 20 to zone 8. Because of the heating and vaporization provided in the lower portion of zone 8, the chlorinated product withdrawn through line 17 will be substantially free of benzene and lighter components, thereby facilitating the ready separation of substantially pure monochlorobenzene in a subsequent fractionation. Zone 8 is maintained at any suitable pressure and temperature conditions to obtain the desired operation as herein described. Because of the vaporization of the excess benzene in the lower portion of zone 8, it is desirable to utilize as low a pressure which is compatible with the desired operation of this zone. Accordingly, the pressure in this zone preferably is from about 5 to about 25 pounds per square inch gauge, although a pressure of from atmospheric to 50 pounds or more per square inch may be employed. The bottom temperature may be within the range of from about 200° to about 400° F. and preferably is within the range of from about 275° to about 350° F. The top temperature may be within the range of from about 150° to about 250° F. and preferably is within the range of from about 175° to about 200° F.

The overhead vapors from column 8 will comprise hydrogen chloride formed in the reaction and will contain entrained benzene. The overhead vapors are withdrawn from the upper portion of zone 8 through line 21, cooled in condenser 22 and passed by way of line 23 into receiver 24. The condensate in receiver 24 will contain benzene and is recycled by way of lines 25 and 3 back to the upper portion of zone 8.

The uncondensed material in receiver 24 is withdrawn therefrom by way of line 26 and may be removed from the process by way of line 27 for any further use or treatment as desired. However, because these vapors will contain entrained benzene and because it generally is desirable to recover as much of the benzene as possible for economical reasons, at least a portion of the vapors in line 26 preferably are passed into compressor 28, line 29, condenser 30 and line 31 into separator 32. While only one compressor is illustrated in the drawing, it is understood that two or more compressors with concomitant coolers and receivers may be employed in order to accomplish incremental increase in pressure to that desired for economical recovery of the benzene. For example, a double compressor system may be employed in which the vapors are increased to a pressure of about 50 pounds per square inch gauge in the first compressor, cooled and condensate removed, and the second compressor increases the pressure to about 200 pounds per square inch, followed by cooling, including refrigeration, if desired, and the condensate is separated from vapor. The condensate collected in one and/or all of the separators preferably is returned to receiver 24. Referring to the drawing, this is illustrated by withdrawing the condensate from separator 32 by way of line 33 and returning the same by way of line 34 to receiver 24.

Vapors from separator 32 are withdrawn from the upper portion thereof by way of line 35 and may be disposed of or treated in any suitable manner as desired. When further recovery of benzene from the vapors is desired, the vapors being withdrawn through line 35 may be passed in contact with a suitable adsorbent material in any suitable manner, not illustrated, in order to selectively adsorb benzene and thereby separate benzene from hydrogen chloride. Any suitable adsorbent may be employed, charcoal being particularly preferred. After the adsorbent becomes saturated with benzene, the benzene is stripped from the adsorbent in any suitable manner and the recovered benzene is recycled to receiver 24 or directly to zone 8, either with or without intervening separation of the stripping medium. Preferably at least two adsorbtion zones are employed so that one may be in operation to adsorb benzene while the other is being subjected to stripping to desorb benzene.

As hereinbefore set forth, the chlorobenzene product being withdrawn from the lower portion of zone 8 preferably is subjected to further fractionation to separate monochlorobenzene from the minor amount of higher boiling material inherently formed in the process. Because of the improved technology of the present process, the amount of higher boiling products will be of a minimum. Referring to the drawing, the chlorobenzene product withdrawn from the lower portion of zone 8 is passed by way of line 18 into fractionator 36. Fractionator 36 will be operated in any suitable manner to separate and recover monochlorbenzene as the primary product of the process. Fractionator 36 may contain suitable packing material and/or fractionating trays, not illustrated, and will be provided with means for heating at the bottom and for cooling at the top. In the case here illustrated, the higher boiling products are withdrawn from the lower portion of fractionator 36 through line 37 for any desired disposal. A portion of the higher boiling products is passed by way of line 38 into and through reboiler 39 and recycled by way of line 40 to fractionator 36. Here again, any suitable means of heating in reboiler 39 may be employed or an externally fired furnace may be used for this purpose. The monochlorobenzene is withdrawn from the upper portion of line 36 through line 41 and recovered as the product of the process. Although not illustrated in the drawing, the monochlorobenzene being withdrawn through line 41 preferably is condensed in a cooler and collected in the receiver, from which a portion of the condensate is recycled to the upper portion of fractionator 36 as a refluxing and cooling medium therein.

As hereinbefore set forth, fractionator 36 will be operated in a suitable manner to separately recover the monochlorobenzene. In one method, reboiler 39 may be maintained at a temperature of from about 350° to about 400° F. and the upper portion of the fractionator maintained at a temperature of from about 260° to about 310° F.

It is understood that these temperatures may be higher or lower depending upon the particular pressure employed, which pressure may be within the range of from atmospheric to 50 pounds per square inch gauge or more and preferably is in the range of from about 5 to about 25 pounds per square inch gauge.

In the interest of simplicity, pumps, valves and similar appurtenances have been omitted from the drawing. It will be understood that these will be provided as required.

The chlorine and benzene will be charged to the process in substantially equal mole proportions, although a slight excess of one of the reactants may be charged to the process. However, as hereinbefore set forth, it is important to maintain a high benzene to chlorine ratio in the reaction section of zone 8, which ratio may be within the range of from 10:1 to 50:1 and preferably is within the range of from 15:1 to 25:1 mole proportions of benzene per mole proportion of chlorine.

The following example is introduced to illustrate one specific operation of the process but is not intended to unduly limit the same.

In an operation similar to that described in the drawing to produce 25,000 barrels per day of monochlorobenzene, a charge of 9.46 moles per hour of benzene is subjected to drying in column 2 utilizing a bottom temperature of about 210° F., a top temperature of about 190° F. and a pressure of about 10 pounds per square inch gauge. The dried benzene and recycle benzene, the latter being at a rate of about 187 moles per hour, are combined and introduced into the upper portion of reactor-fractionator 8. Chlorine gas is introduced at a rate of 9.56 moles per hour and at a temperature of 75° F. into a mid-portion of zone 8 to commingle therein with the ascending benzene vapors and pass upwardly into the catalyst. Two beds of ⅝" carbon steel Pall rings are disposed in the upper portion of zone 8. Reboiler 16 serves to heat the lower portion of zone 8 to a temperature of about 310° F. The monchlorobenzene and excess benzene descend from the upper portion of zone 8 through downspout 14 into the lower portion of zone 8 to be fractionated therein. Excess benzene is vaporized and passed upwardly to commingle with the chlorine in the mid-portion of the zone. Zone 8 is operated at a low pressure of about 10 pounds per square inch gauge. The overhead vapors from zone 8 are cooled in condenser 22 and collected in receiver 24, wherefrom the condensate is withdrawn and recycled to zone 8. The material uncondensed in zone 8 is compressed in a multiple compressor system to a pressure of about 190 pounds per square inch and cooled and collected in separator 32. About 6 moles per hour of condensate is returned from separator 32 by way of line 34 to receiver 24. The uncondensed material is withdrawn from the upper portion of separator 32 at a rate of about 19 moles per hour.

The chlorobenzene product is withdrawn from reactor-fractionator 8 at a rate of about 9.5 moles per hour and is subjected to fractionation in zone 36. Zone 36 is heated at the bottom to a temperature of about 375° F. and cooled at the top to a temperature of about 285° F. The monochlorobenzene is withdrawn from the upper portion of fractionator 36 at a rate of about 9.25 moles per hour. The higher boiling products are withdrawn from the lower portion of zone 36 at a rate of only about 0.18 mole per hour.

From the above description, it will be seen that the novel process of the present invention offers an improved method and apparatus for the continuous chlorination of benzene to produce an increased yield of monochlorobenzene and a minimum production of polychlorobenzene.

I claim as my invention:

1. A process for the continuous chlorination of benzene which comprises continuously introducing liquid benzene into the upper portion of a combination reactor fractionator zone maintained at a top temperature of from about 150° to about 250° F., a bottom temperature of from about 200° to about 400° F. and a pressure of from atmospheric to about 50 pounds per square inch, passing the benzene downwardly through a bed of a nuclear chlorinating catalyst disposed in the upper portion of said zone, continuously introducing gaseous chlorine into the mid-portion of said zone, reacting benzene and chlorine in contact with said catalyst in the upper portion of said zone to form chlorobenzene, passing liquid chlorobenzene and unreacted benzene downwardly from said catalyst bed into the lower portion of said combination zone while diverting the same from contact with the chlorine being introduced into the mid-portion of said zone, heating the lower portion of said zone to vaporize and separate benzene from chlorobenzene, commingling the resultant benzene vapors with said gaseous chlorine in the mid-portion of said zone, the mole ratio of benzene to chlorine being within the range of from about 10:1 to about 50:1, and passing the mixture of chlorine and benzene vapors upwardly into said catalyst bed in the upper portion of said zone, continuously withdrawing chlorobenzene from the lower portion of said combination zone, and continuously withdrawing hydrogen chloride formed in said reaction from the upper portion of said combination zone.

2. The process of claim 1 further characterized in that the mole ratio of benzene to chlorine in the mid-portion of said zone is within the range of from about 15:1 to about 25:1.

3. The process of claim 2 wherein said catalyst is selected from the group consisting of carbon steel rings, iron turnings and ferric chloride.

References Cited

UNITED STATES PATENTS 2,168,260   8/1939   Heisel et al. _____ 260—650 XR

LEON ZITVER, *Primary Examiner.*

N. J. KING, JR., H. T. MARS, *Assistant Examiners.*